(12) United States Patent
Wright et al.

(10) Patent No.: US 7,382,801 B2
(45) Date of Patent: Jun. 3, 2008

(54) LINK CAPACITY DIMENSIONING METHODS FOR PACKET SWITCHED COMMUNICATIONS NETWORKS, AND NETWORKS AND LINKS DIMENSIONED THEREBY

(75) Inventors: Steven Wright, Roswell, GA (US); Neil Gilmartin, Atlanta, GA (US)

(73) Assignee: AT&T Deleware Intellectual Property, Inc., Wilmington, DE (US)

( * ) Notice: Subject to any disclaimer, the term of this patent is extended or adjusted under 35 U.S.C. 154(b) by 967 days.

(21) Appl. No.: 10/654,147

(22) Filed: Sep. 3, 2003

(65) Prior Publication Data

US 2005/0068964 A1 Mar. 31, 2005

(51) Int. Cl.
*H04J 3/16* (2006.01)
(52) U.S. Cl. ................................................ 370/468
(58) Field of Classification Search ........... 370/395.21, 370/395.41, 465, 468, 477, 329, 341, 348
See application file for complete search history.

(56) References Cited

U.S. PATENT DOCUMENTS

| | | | |
|---|---|---|---|
| 5,727,051 A | 3/1998 | Holender | |
| 5,764,740 A | 6/1998 | Holender | |
| 5,872,918 A | 2/1999 | Malomsoky et al. | |
| 6,151,305 A | 11/2000 | Chen | |
| 6,266,322 B1 | 7/2001 | Berger et al. | |
| 6,304,639 B1 | 10/2001 | Malomsoky et al. | |
| 6,359,863 B1* | 3/2002 | Varma et al. | 370/232 |
| 6,538,989 B1 | 3/2003 | Carter et al. | |
| 6,748,443 B1* | 6/2004 | Parry et al. | 709/232 |
| 6,912,232 B1* | 6/2005 | Duffield et al. | 370/468 |
| 6,975,594 B1* | 12/2005 | Byers | 370/238 |
| 7,058,027 B1* | 6/2006 | Alessi et al. | 370/310.1 |
| 7,072,344 B2* | 7/2006 | Abdelilah et al. | 370/395.21 |
| 7,149,222 B2* | 12/2006 | Wiryaman et al. | 370/401 |
| 2003/0021295 A1* | 1/2003 | Sahinoglu et al. | 370/468 |
| 2003/0048805 A1* | 3/2003 | Yoshihara et al. | 370/468 |

OTHER PUBLICATIONS

Wright, *Method for Traffic Engineering of Connectionless Virtual Private Network Services*, U.S. Appl. No. 10/382,258, filed Mar. 5, 2003.

\* cited by examiner

*Primary Examiner*—Ricky Ngo
*Assistant Examiner*—Kan Yuen
(74) *Attorney, Agent, or Firm*—Myers Bigel Sibley & Sajovec, P.A.

(57) ABSTRACT

A packet switched communications network that includes nodes that are interconnected by links, is dimensioned to accommodate committed bandwidths for ports that are connected to packet switched communications network. Bandwidth of a given link that includes first and second ends is provided, based on a link dimensioning rule that is a function of committed bandwidths from ports that are connected to the first end of the given link and ports that are connected to the second end of the given link. The packet switched communications network provider agrees to provide communications service for a customer through the packet switched communications network at a first committed bandwidth. At least some of the links are dimensioned to accommodate the first committed bandwidth. Upon occurrence of degraded performance for the customer over the packet switched communications network, the packet switched communications network provider agrees to provide communications service for the customer at a second committed bandwidth that is greater than the first committed bandwidth. The packet switched communications network provider then dimensions at least some of the links to accommodate the second committed bandwidth.

34 Claims, 8 Drawing Sheets

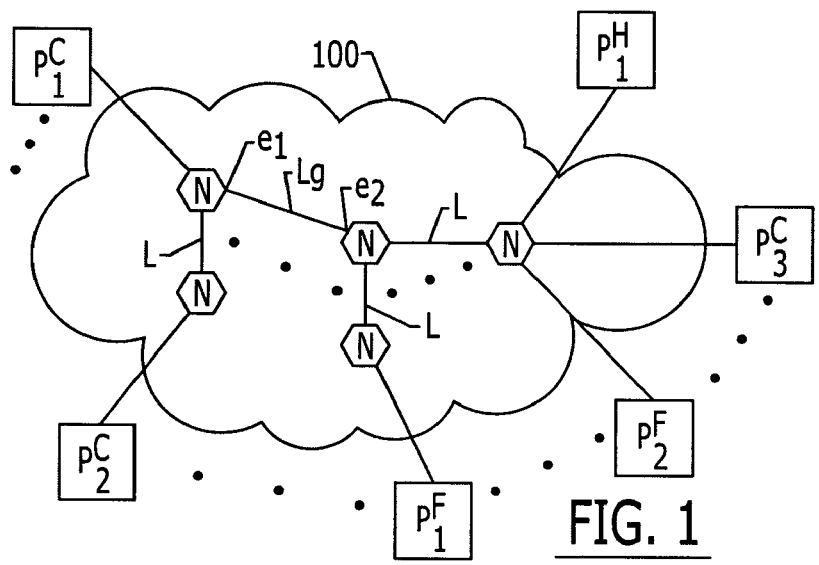
FIG. 1
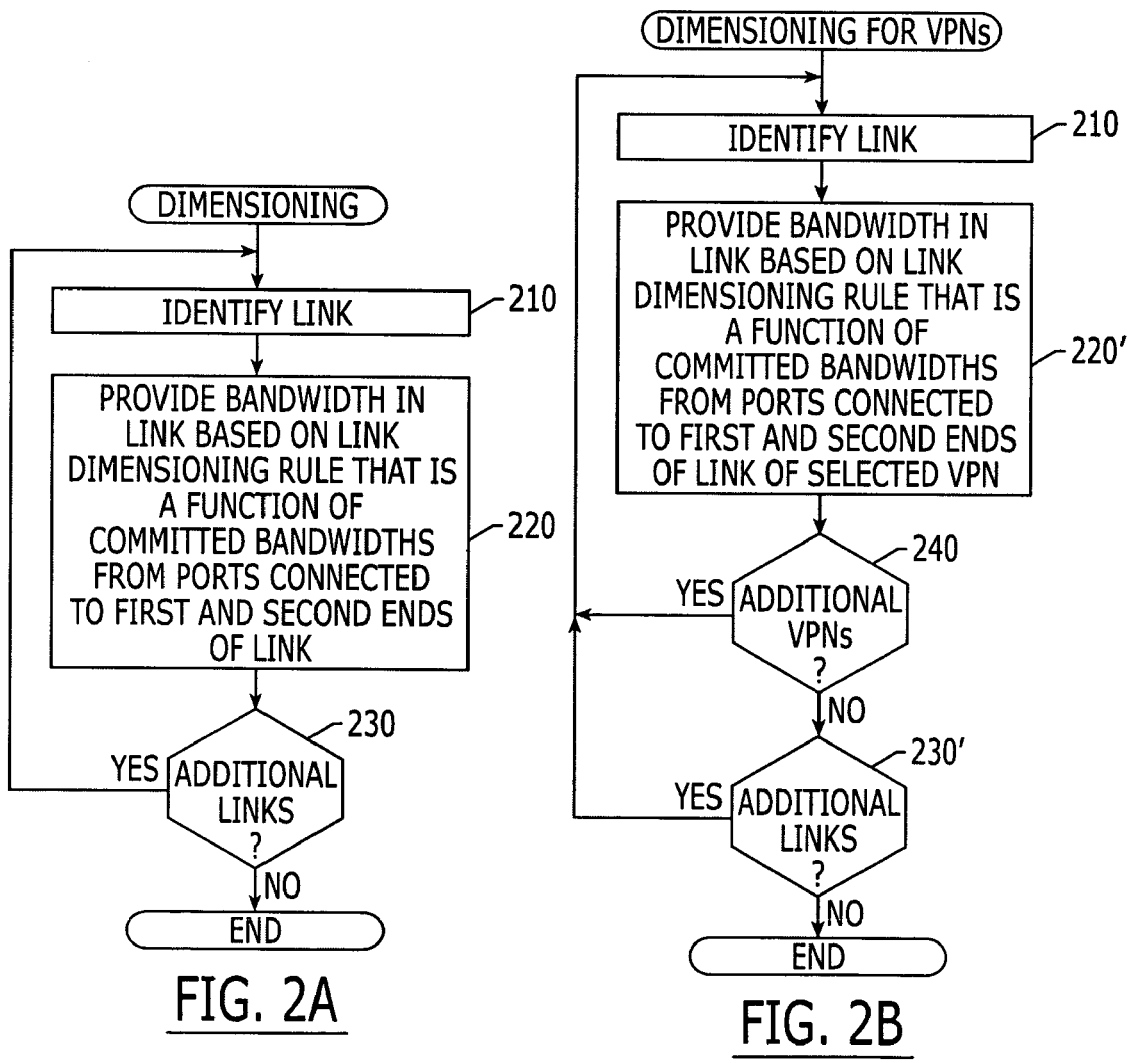
FIG. 2A
FIG. 2B

Network Reserves Bandwidth to support MIN (X,Y)

Assume all traffic is targeted to the Hub
There is no need to dimension for traffic between the leaf sites
MIN (3X, Y) may be reserved

LINK CAPACITY DIMENSIONING METHODS FOR PACKET SWITCHED COMMUNICATIONS NETWORKS, AND NETWORKS AND LINKS DIMENSIONED THEREBY

FIELD OF THE INVENTION

This invention relates to communications networks, and more particularly to packet switched communications networks.

BACKGROUND OF THE INVENTION

Communications networks are widely used to communicate voice, video, multimedia and/or data. Communications network providers may invest large sums of money in the infrastructure that is used to provide a communications network. In order to optimize this investment, it may be desirable to dimension the network, so that neither overcapacity nor under-capacity is provided for the voice, video, multimedia and/or data communications.

Dimensioning of a connection-oriented (circuit switched) network may be relatively simple because a user is allocated a circuit by provision and/or by on-demand signaling. It may, thus, be relatively straightforward to dimension these circuits.

In contrast, in a connectionless communications network, also referred to herein as a packet switched communications network, a specific circuit allocation may not be provided. Thus, it may be more difficult to dimension the elements of the network. As is well known to those having skill in the art, a packet switched communications network includes a plurality of nodes that are interconnected by a plurality of links. A plurality of ports are connected to the packet switched communications network.

It is known to dimension the links in a packet switched communications network by measuring link utilization and increasing link capacity when link utilization crosses a threshold. Unfortunately, this technique may lead to an "all you can eat" effect, wherein the network operator or provider keeps increasing capacity as more traffic is sent, with little or no leverage to increase revenue. This business model for connectionless services may not be economically sustainable.

SUMMARY OF THE INVENTION

Some embodiments of the present invention dimension a packet switched communications network that includes nodes that are interconnected by links, to accommodate committed bandwidths for ports that are connected to packet switched communications network. According to some embodiments of the present invention, bandwidth of a given link that includes first and second ends is provided, based on a link dimensioning rule that is a function of committed bandwidths from ports that are connected to the first end of the given link and ports that are connected to the second end of the given link. In some embodiments, the packet switched communications network is an Ethernet network and the links are Ethernet bridges.

In some embodiments, bandwidth is provided in the given link by identifying a first sum of committed bandwidths from the ports that are connected to the first end of the given link, and a second sum of committed bandwidths from the ports that are connected to the second end of the given link. Bandwidth is provided in the given link that is at least equal to, and in some embodiments is equal to, the minimum of the first sum and the second sum.

In some embodiments, providing bandwidth for the plurality of links is repeatedly performed, to thereby dimension the packet switched communications network. In other embodiments, the packet switched communications network provides a plurality of virtual private networks between selected ones of the plurality of ports. In these embodiments, providing bandwidth may be performed by providing bandwidth in a given link that includes first and second ends, for a selected one of the virtual private networks, based on a link dimensioning rule that is a function of ports that are connected to the first end of the given link for the selected one of the plurality of virtual private networks, and ports that are connected to the second end of the given link for the selected one of the plurality of virtual private networks. The providing of bandwidth of a given link is then repeatedly performed for the plurality of virtual private networks, to thereby determine an aggregate bandwidth for the given link. Bandwidth calculations may then be repeatedly performed for the plurality of links for the plurality of virtual private networks, to thereby dimension the packet switched communications network.

In still other embodiments, dimensioning can also accommodate fixed bandwidths for second ports that are connected to the packet switched communications network, by providing bandwidth at the given link that is at least equal to, and in some embodiments is equal to, a minimum of the first sum plus a sum of fixed bandwidths from the second ports that are connected to the first end of the given link, and the second sum plus a sum of fixed bandwidths from the second ports that are connected to the second end of the given link.

In still other embodiments, other link dimensioning rules may be applied when one of the ports that is connected to the second end of the given link is a hub having a hub-committed bandwidth. In these embodiments, bandwidth is provided in the given link that is at least equal to, and in some embodiments is equal to, a minimum of the first sum and the hub-committed bandwidth minus the second sum. In still other embodiments, this bandwidth is at least equal to, and in some embodiments is equal to, a minimum of the first sum and the hub-committed bandwidth.

According to other embodiments of the present invention, the packet switched communications network provider agrees to provide communications service for a customer through the packet switched communications network at a first committed bandwidth. At least some of the links are dimensioned to accommodate the first committed bandwidth. Upon occurrence of degraded performance for the customer over the packet switched communications network, the packet switched communications network provider agrees to provide communications service for the customer at a second committed bandwidth that is greater than the first committed bandwidth. The packet switched communications network provider then dimensions at least some of the links to accommodate the second committed bandwidth.

Occurrence of degraded performance may be recognized by the customer and reported to the packet switched communications network operator, and/or detected by the packet switched communications network provider and reported to the customer. The first committed bandwidth may be provided by the packet switched communications network provider to the customer at a first financial charge, and the second committed bandwidth may be provided to the customer by the packet switched communications network provider at a second financial charge that is greater than the first financial charge.

It will be understood by those having skill in the art that, although embodiments of the present invention have been described above primarily with respect to methods of dimensioning packet switched communications networks and methods of providing communications service by a packet switched communications network, other embodiments of the present invention can provide packet switched communications networks and links thereof that are dimensioned as was described above.

BRIEF DESCRIPTION OF THE DRAWINGS

FIG. 1 is a block diagram of a packet switched communications network that can be dimensioned according to various embodiments of the present invention.

FIGS. 2A-5 are flowcharts of operations that may be provided for dimensioning a packet switched communications network according to various embodiments of the present invention.

DETAILED DESCRIPTION

Figure 3:
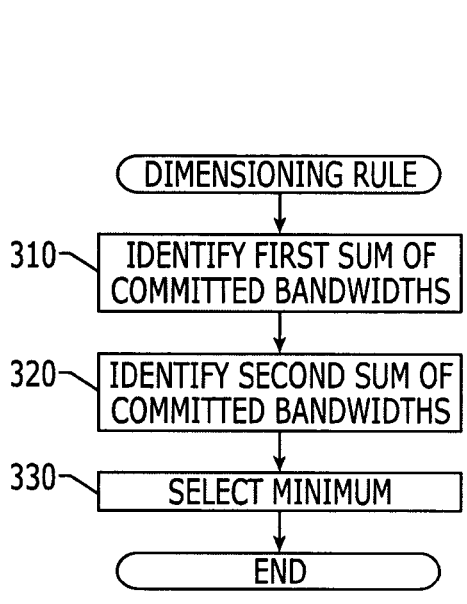

The present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout. It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

FIG. 1 is a block diagram of a packet switched communications network that can be dimensioned according to various embodiments of the present invention. As shown in FIG. 1, the packet switched communications network 100 includes a plurality of nodes N that are interconnected by a plurality of links L. A plurality of ports P are connected to the packet switched communications network 100. It will be understood that although FIG. 1 illustrates five nodes N, four links L and six ports P, conventionally, many more nodes, links and ports are provided in a packet switched communications network 100. As shown in FIG. 1, the packet switched communications network 100 is or may be modeled as a loop-free tree comprising a plurality of nodes and the plurality of links. Modeling a network as a loop-free tree is well known to those having skill in the art and need not be described further herein.

FIG. 2A is a block diagram of operations that may be performed to dimension a packet switched communications network according to some embodiments of the present invention. Dimensioning operations may be performed manually and/or automatically by the packet switched communications network provider or operator using one or more enterprise, application, personal and/or pervasive computing devices which may be connected to packet switched communications network 100.

Referring to FIGS. 1 and 2A, at Block 210, a link $L_g$ to be dimensioned, also referred to herein as a "given link", is identified. The given link $L_g$ includes first and second ends $e_1$, and $e_2$, each of which is connected to a node N. Referring to Block 220, bandwidth is provided in the given link $L_g$ based on a link dimensioning rule that is a function of aggregate committed bandwidths from committed bandwidth ports, such as ports $P_1^c$ and $P_2^c$, that are connected to the first end $e_1$ of the given link $L_g$, and ports, such as port $P_3^c$, that are connected to the second end $e_2$ of the given link $L_g$. If additional links are to be dimensioned at Block 230, operations of Block 210 and 220 may be performed repeatedly. Accordingly, a heuristic for dimensioning a link bandwidth is provided.

FIG. 2B is a block diagram of operations that may be performed to dimension a packet switched communication network that provides a plurality of Virtual Private Networks (VPN) between selected ones of the plurality of ports. VPNs are well known to those having skill in the art and need not be described further herein. As shown in FIG. 2B, dimensioning for a VPN may be provided by identifying a given link at Block 210. At Block 220', bandwidth is provided in the given link for a selected one of the VPNs, based on a link dimensioning rule such as was described above, for the selected one of the plurality of VPNs. Then, at Block 240, if additional VPNs are provided, bandwidth is provided in the given link for all of the VPNs, to thereby determine an aggregate bandwidth for the given link. At Block 230', a determination is made as to whether additional links are present. If present, the operations of Blocks 210, 220' and 240 are performed iteratively. Accordingly, the packet switched communications network can be dimensioned. It will be understood that, in some embodiments of the invention, the packet switched communications network is an Ethernet network, and the links comprise Ethernet bridges. Ethernet networks and Ethernet bridges are well known to those having skill in the art and need not be described further herein. Accordingly, embodiments of the present invention can be used to dimension an Ethernet network and, in particular, Ethernet bridges that are used to provide a plurality of VPNs.

For example, referring back to FIG. 1, the ports $P_1^c$, $P_2^c$ and $P_3^c$ may all be ports on the same VPN and ports $P_1^F$ and $P_2^F$ may be ports on a different VPN. Thus, as was described in FIG. 2B, dimensioning of a given link such as an Ethernet bridge may be performed by repeatedly applying the dimensioning rule to each of the VPNs that use the given link to obtain an aggregate bandwidth for the given link. Aggregate bandwidth may then be accumulated for other links in the network, to thereby dimension the network.

FIG. 3 is a flowchart of dimensioning rules that can be applied according to some embodiments of the present invention. According to some embodiments of the present invention, the dimensioning rules of FIG. 3 may be performed as part of the operations of Block 220 of FIG. 2.

Referring now to FIG. 3, at Block 310, a first sum of committed bandwidths is identified for the committed bandwidth ports $P_1^c$, $P_2^c$ that are connected to the first end $e_1$ of the given link $L_g$. At Block 320, a second sum of committed bandwidths for the committed bandwidth ports that are connected to the second end $e_2$ of the given link $L_g$, is identified. Finally, at Block 330, a bandwidth in the given link is provided that is at least equal to, and in some embodiments is equal to, a minimum of the first sum (Block 310) and the second sum (Block 320).

Figure 4:
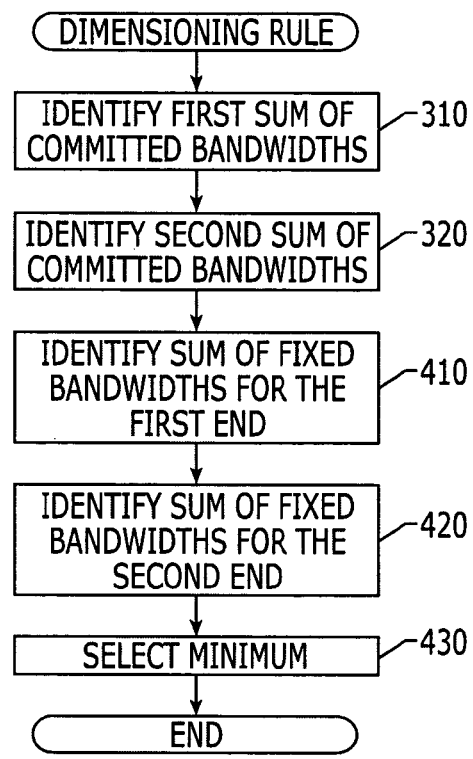

FIG. 4 is a flowchart of operations that may be provided for other dimensioning rules according to other embodiments of the present invention. These dimensioning rules can accommodate committed bandwidth services and fixed bandwidth services.

Referring to FIG. 4, the operations of Blocks 310 and 320 are first provided. Then, a Block 410, a sum of fixed bandwidths for a plurality of second ports that are connected to the first end $e_1$ of the given link $L_g$ is identified. At Block 420, a sum of fixed bandwidths for a plurality of second ports $P_1^F$, $P_2^F$ that are connected to the second end $e_2$ of the given link $L_g$ is identified. Finally, at Block 430, bandwidth at the given link $L_g$ is provided that is at least equal to, and in some embodiments is equal to, a minimum of the first sum, plus the sum of fixed bandwidths from the plurality of second ports that are connected to the first end of the given link (Blocks 310 and 410) and the second sum plus the sum of fixed bandwidths from the plurality of second ports that are connected to the second end of the given links (Blocks 320 and 420). It will be understood that in some embodiments, the sum of the committed bandwidths and the fixed bandwidths is maintained to be less than the physical port speed of a trunk.

Figure 5:
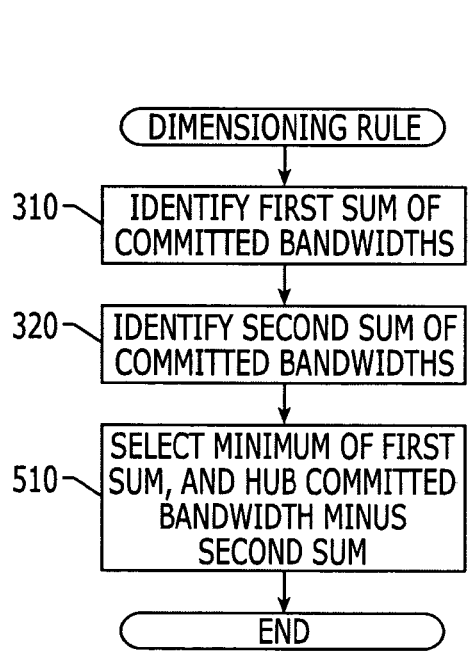

FIG. 5 is a flowchart of operations that may be performed to provide other dimensioning rules according to other embodiments of the present invention. These embodiments may be utilized when one of the ports $P_1^H$ that is connected to the second end $e_2$ of the given link $L_g$ is a hub having a hub-committed bandwidth. As shown in FIG. 5, the operations of Blocks 310 and 320 are first performed. Then, at Block 510, a bandwidth in the given link is provided that is at least equal to, and in some embodiments, is equal to, a minimum of the first sum (Block 310), and the hub-committed bandwidth minus the second sum (Block 320). In other embodiments, a bandwidth in the given link is provided that is at least equal to, and in some embodiments, is equal to, a minimum of the first sum and the hub-committed bandwidth.

Figure 6:
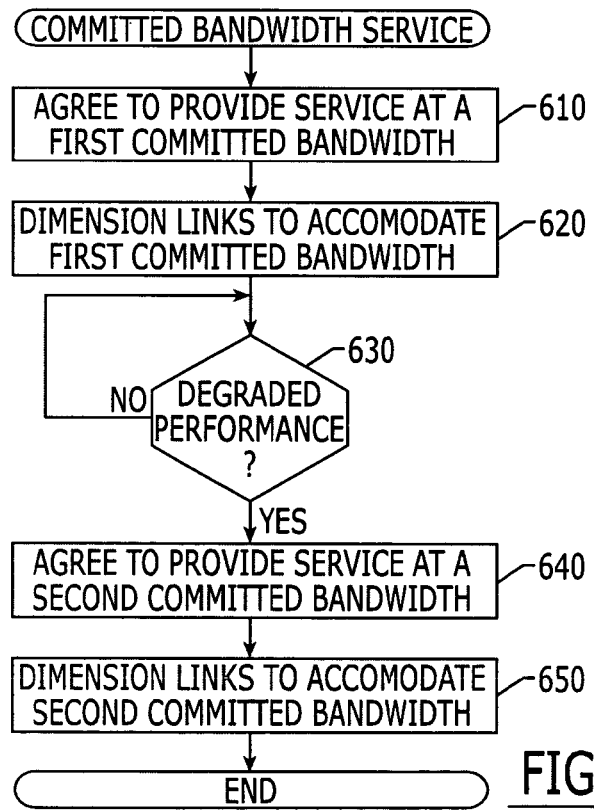
FIGS. 6-7 are flowcharts of operations that may be used to provide committed bandwidth service according to various embodiments of the present invention.

FIG. 6 is a flowchart of operations for providing committed bandwidth service by a packet switched communications network provider to a customer. At Block 610, an agreement is reached between the packet switched communications network provider and the customer, to provide communications service for the customer over a plurality of customer ports that are connected to the packet switched communications network, at a first committed bandwidth. Then, at Block 620, at least some of the links are dimensioned to accommodate the first committed bandwidth. Dimensioning may be provided as was described above in connection with FIGS. 2-5 and/or using other techniques. At Block 630, upon occurrence of degraded performance for the customer over the packet switched communications network, an agreement is reached at Block 640 to provide service at a second committed bandwidth that is greater than the first committed bandwidth and, in some embodiments, at a greater cost (financial charge to the customer) than the cost of the first committed bandwidth. At Block 650, at least some of the links are then dimensioned to accommodate the second committed bandwidth. It will be understood that, in Block 630, degraded performance may be detected and reported by the customer and/or detected by the packet switched communications network provider.

Figure 7:
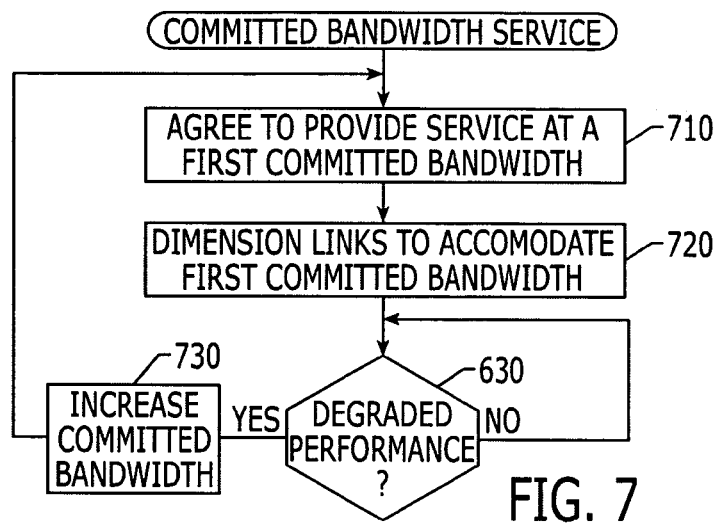

FIG. 7 is a flowchart of other embodiments of the present invention that can provide committed bandwidth service to a customer. As shown in FIG. 7, at Block 710, an agreement is reached with the customer to provide service at a committed bandwidth. At Block 720, at least one of the links is dimensioned to accommodate the committed bandwidth using, for example, any of the dimensioning rules that were described above in connection with FIGS. 2-5. At Block 630, upon degradation of performance, the committed bandwidth is increased at Block 730. An agreement is again reached at Block 710, and the links are dimensioned at Block 720.

Additional qualitative discussion of various embodiments of the present invention now will be provided. In particular, some embodiments of the present invention can provide a committed bandwidth network service and can dimension the packet switched communications network to accommodate committed bandwidths for a plurality of ports that are connected to the packet switched communications network. The desire to provide committed bandwidths may arise from market research that pointed to a demand for a packet switched communications network service, such as an Ethernet service, that offers guaranteed bandwidth for point-to-point and multipoint topologies. Accordingly, a minimum Committed BandWidth (CBW) rate may be introduced by the network provider. The CBW rate may be defined as the minimum bandwidth across the switched core network that will always be available to transport data originating from a specific customer port or location. In some embodiments, the actual bandwidth that is made available for customer data throughput may be the CBW rate less overhead. In some embodiments, 50, 100, 250 and 500 megabits per second (Mb/s) committed bandwidth rates may be offered. Other rates also may be offered.

Figure 8:
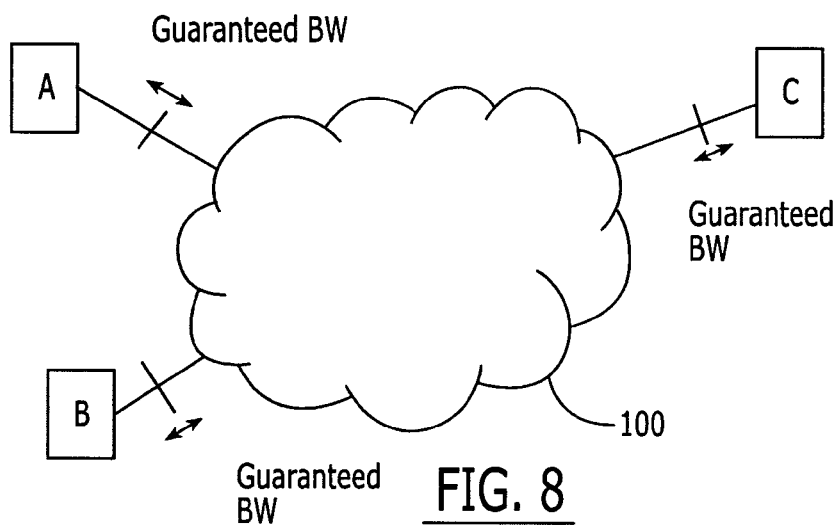
FIGS. 8-12 are block diagrams of packet switched communications networks according to various embodiments of the present invention that are dimensioned according to various embodiments of the present invention.

FIG. 8 conceptually illustrates committed bandwidth service, where the term "Guaranteed BW" is used to indicate committed bandwidth. It will be understood that committed bandwidth or guaranteed bandwidth may not just refer to an access port speed guarantee but, rather, the customer may be able to achieve the bandwidth guarantee across the entire cloud of the network 100. Thus, the committed bandwidth may be equal to the minimum bandwidth guarantee of any two interfaces in the network 100.

Accordingly, to provide committed or guaranteed bandwidth for a connectionless (packet switched) communication network, the network provider may need to be able to guarantee bandwidth between each of the end points of that connectionless service. Referring to FIG. 8, even though port A may have a maximum bandwidth to the network of, for example, X Mb/s, the network provider should be able to dimension the network 100 such that those X Mb/s can be delivered to any other node of the connectionless network, such as nodes B and C. One approach would be to reserve bandwidth for each direct path, i.e., A-B and A-C. This may, essentially, reserve 2 X MB/s throughout the network, even though the source A can only send a maximum of X Mb/s, and may provide over-dimensioning of the network. A slightly modified case may occur where not all nodes in the network support the same bandwidths for transmission and/ or reception. For example, referring to FIG. 8, node A may transmit at a rate of X Mb/s, but node C may only receive at Y Mb/s, which is less than X Mb/s. This is sometimes referred to as a "hose model" quality of service, in comparison to the connection-oriented pipe model quality of service.

The committed bandwidth service may allocate network capacity across the network at service provisioning time. In order to simplify this provisioning operation, in some embodiments of the present invention, a restricted topology may be desirable. Thus, it may be desirable in some embodiments that the network topology be a virtual or physical tree structure, which can thereby simplify the trunk capacity calculations. Accordingly, in some embodiments, the packet switched communications network is modeled as a loop-free tree comprising a plurality of nodes and a plurality of links. Moreover, in other embodiments of the invention, committed bandwidth and fixed bandwidth traffic will share trunks in the network.

The service behavior desired provides network guarantees within a defined network capacity (the CBW) offered to the customer. This service may explicitly define the behavior in the case when customer traffic exceeds this level. Generally, customer traffic that exceeds the expected level may be dropped, shaped and/or reclassified to a lower grade of service.

Figure 9:
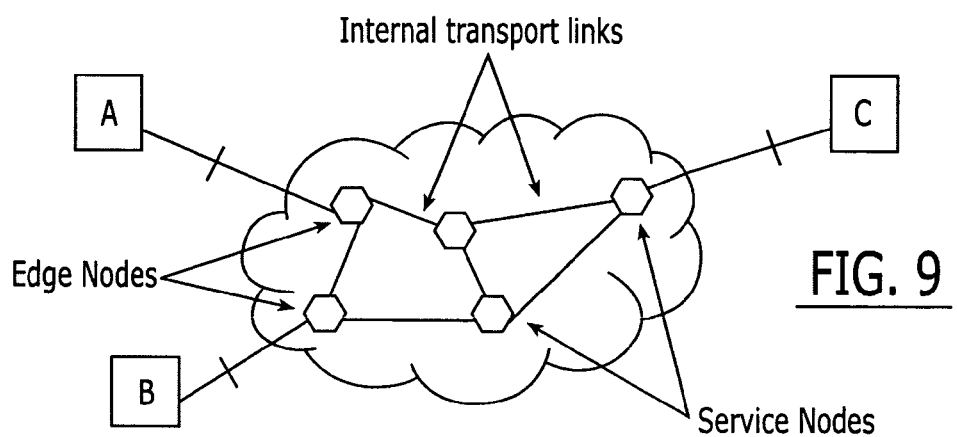

FIG. 9 illustrates dimensioning for committed bandwidth according to some embodiments of the present invention. As shown in FIG. 9, it may be desired to dimension the links of the packet switched communications network 100, referred to in FIG. 9 as "internal transport links", which exist between nodes of the network. Thus, the basic components involved are the internal transport links and service nodes used to provide the connectionless service. The links are considered to be transport links that provide a fixed bandwidth transport service between the service nodes. Examples of links include Ethernet, Synchronous Optical NETwork (SONET), or virtual circuit links with bandwidth guarantees through an Asynchronous Transfer Mode (ATM) network. The service nodes can provide the connectionless service, such as an emulated LAN, virtual private network and/or native Ethernet switching capability. For the examples that follow, a native Ethernet trunking capability is assumed. However, virtual implementation using an emulated LAN (virtual private LAN service) may be similarly provided. The edge nodes of FIG. 9 are the subset of service nodes that interface directly to the customer via ports A, B or C.

Figure 10A:
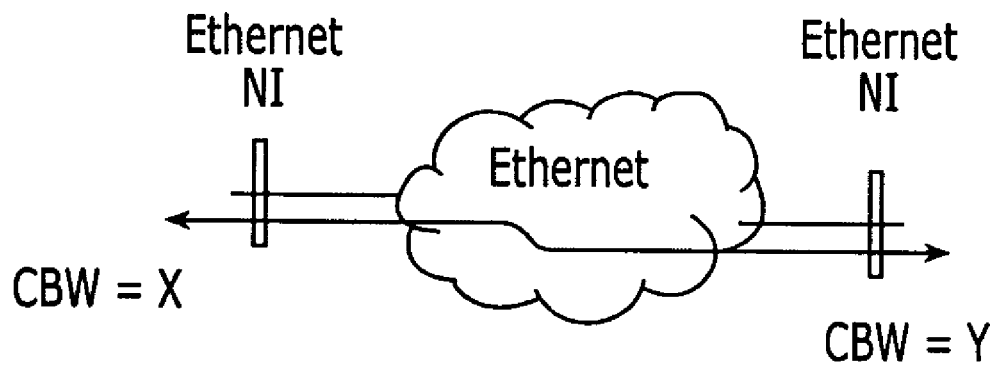
Figure 10B:
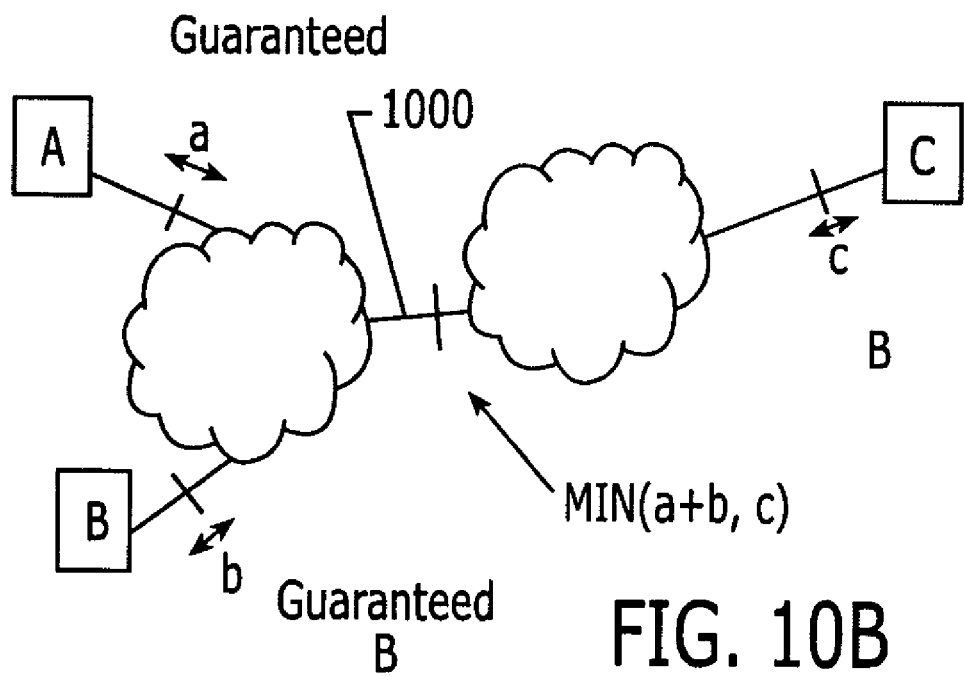

Committed bandwidth for a multi-point connectionless service can mean that all ports can transmit at their maximum feasible committed rate, and the network will be dimensioned such that traffic is not dropped across the network core. This approach can, therefore, accommodate the worst case. According to some embodiments of the invention, when the bandwidth commitments are asymmetric, the network may only be provisioned to support the minimum of the two ingress bandwidth commitments at any intermediate point in the network, as illustrated in FIG. 10A, for point-to-point and in FIG. 10B, for multi-point cases. As shown in FIG. 10A, for a point-to-point connection, embodiments of the present invention dimension the network to reserve bandwidth to support the minimum of X, Y. In FIG. 10B, for multi-point cases, a given link 1000 may be dimensioned such that the bandwidth of the given link 1000 is at least equal to a minimum of a first sum of committed bandwidths from the ports that are connected to the first end of the given link, and a second sum of committed bandwidths that are connected to the second end of the given link 1000. Thus, in FIG. 10B, link 1000 may be dimensioned to have a bandwidth of MIN (a+b, c), according to some embodiments of the present invention.

Figure 11:
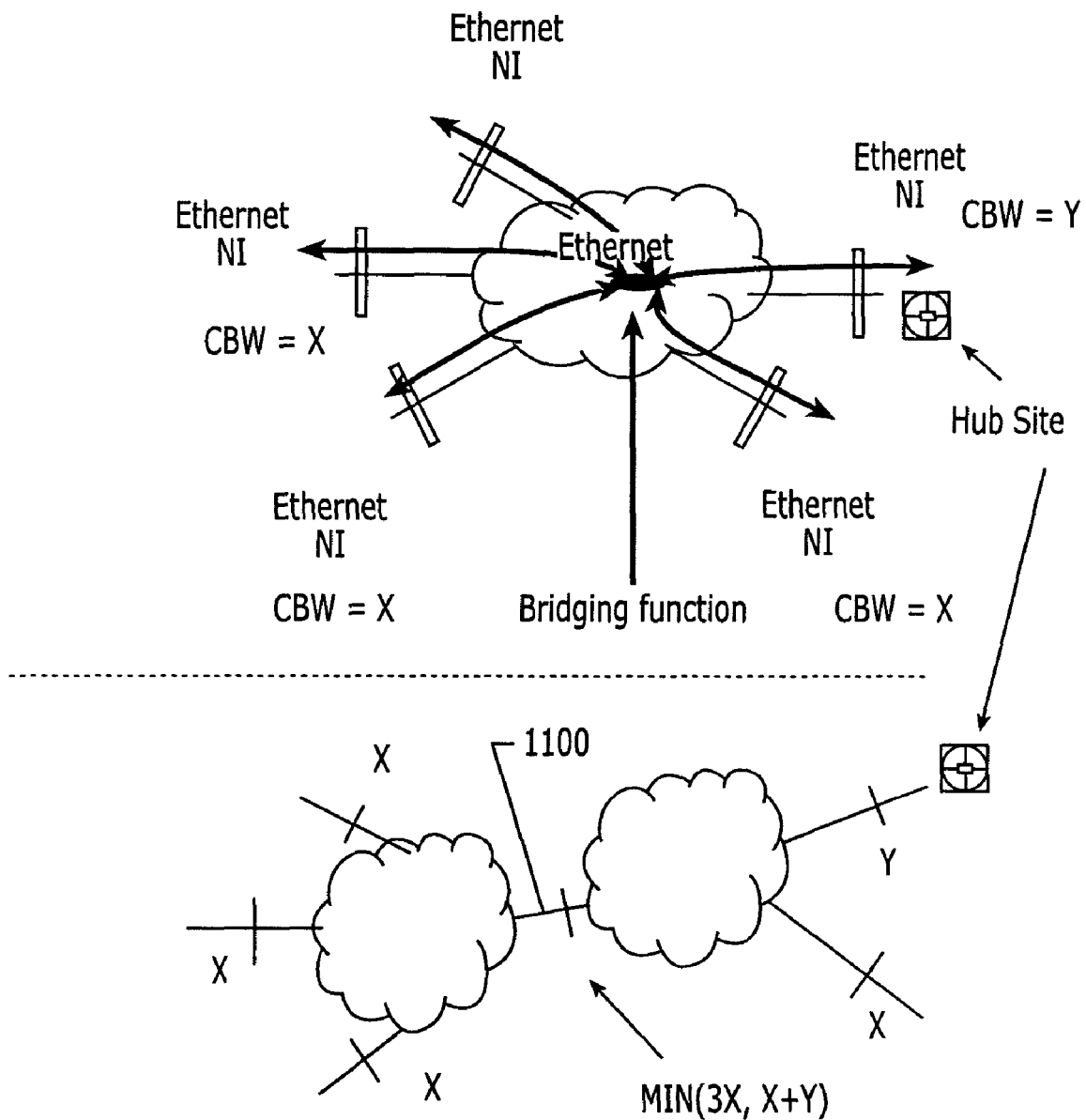

FIG. 11 illustrates other network configurations that include a hub site that is larger than the rest of the ports. As shown in FIG. 11, in the presence of a hub site, embodiments of FIGS. 10A and 10B may over-dimension the network core. In FIG. 11, where the customer aggregates a lot of traffic to a hub site, and all traffic is targeted to the hub, there may be no need to dimension for traffic between the leaf sites. Thus, in these embodiments of the present invention, link 1100 may be dimensioned as MIN(3X, Y). Moreover, in other embodiments, an assumption can be made that MIN (3X, Y-X) should be sufficient.

Figure 12:
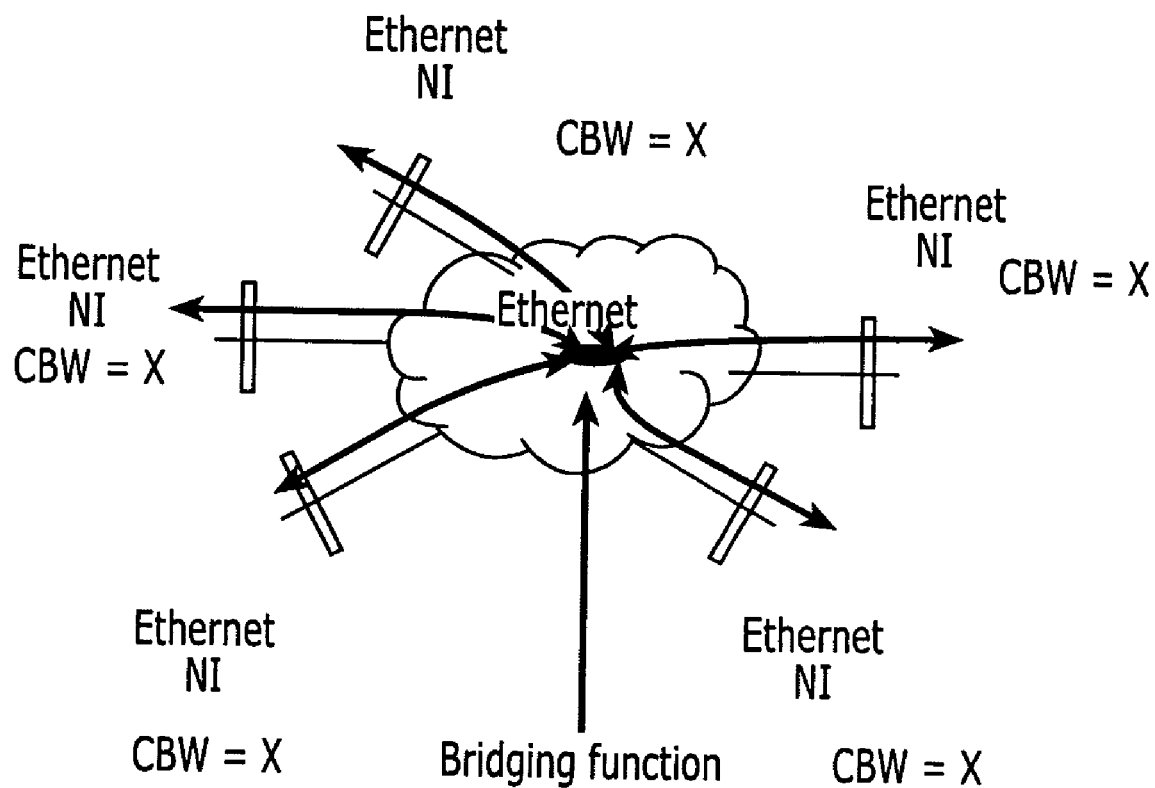
Figure 12:
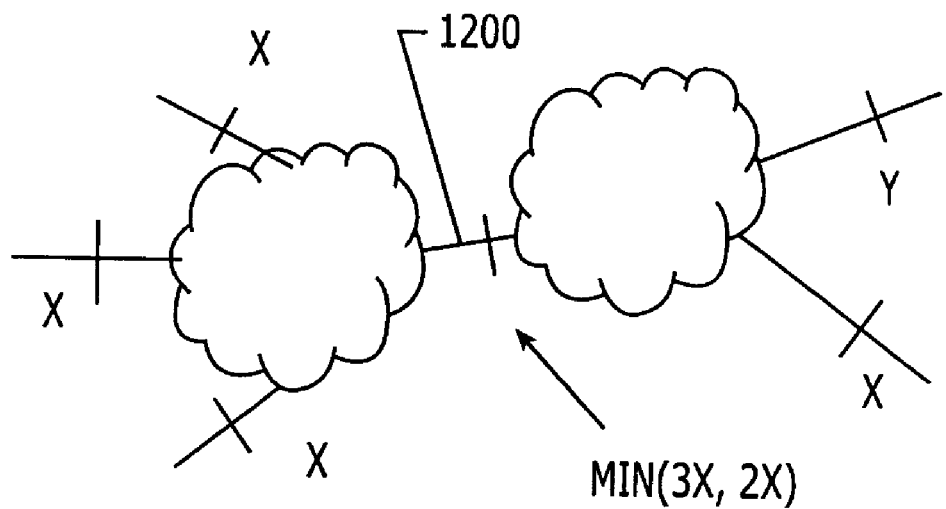

FIG. 12 illustrates another common customer architecture: peer-to-peer. In this architecture, all sites are the same size, denoted X, and the network service therefore may appear like a virtual Ethernet switch. In these embodiments, as shown in FIG. 12, a given link 1200 may be dimensioned at MIN(3X, 2X) to provide committed bandwidth.

Figure 13A:
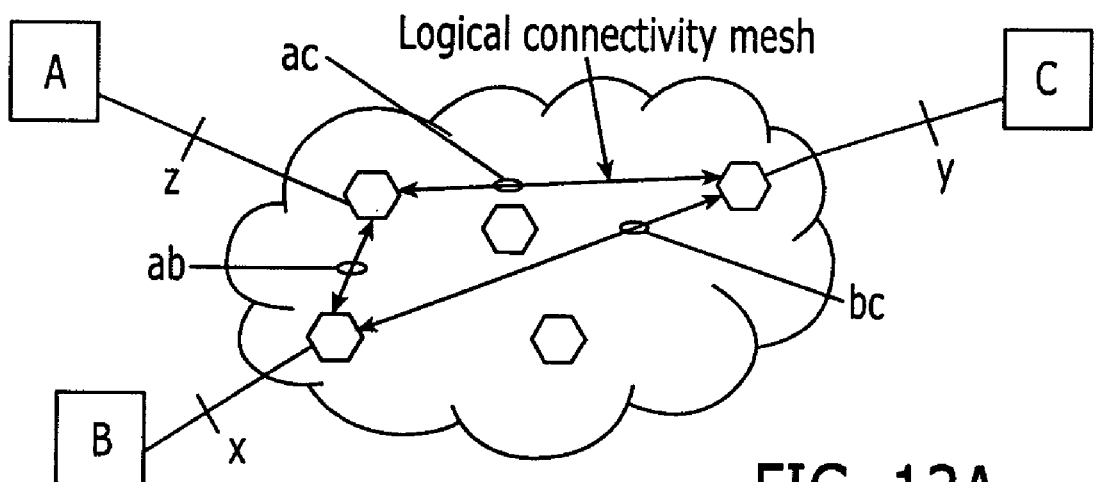
FIGS. 13A and 13B are block diagrams illustrating converting a packet switched communications network to a loop-free packet switched communications network.
Figure 13B:
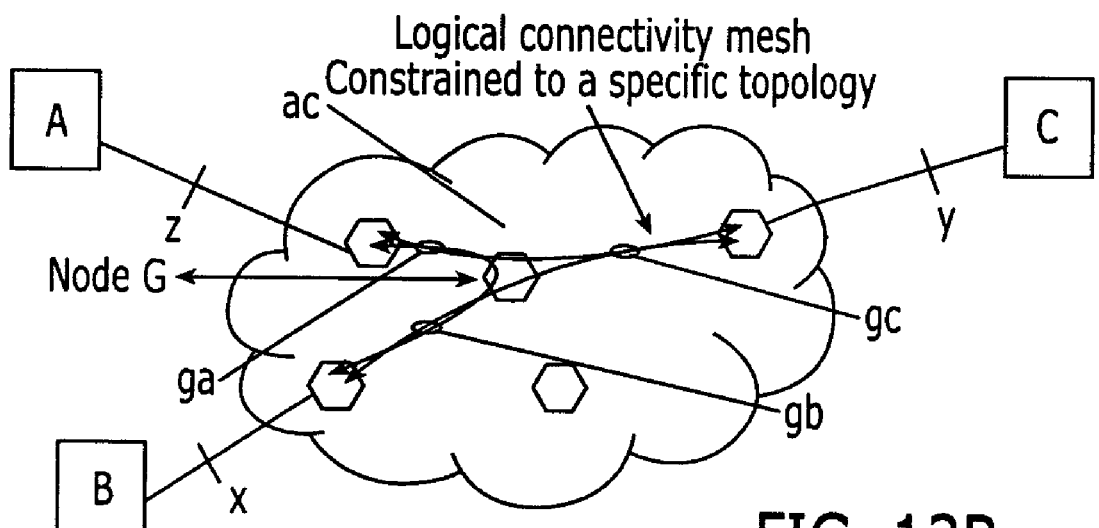

FIGS. 13A and 13B illustrate modeling the packet switched communications network as a loop-free tree comprising a plurality of nodes and a plurality of links according to embodiments of the present invention. In FIG. 13A, a simplified example is provided with three ports A, B, C, each of which have a CBW service with z, x and y Mb/s of bandwidth reserved. Assume that A is the head end and z is greater than x or y. Further assume that x is greater than y so that site B is bigger than site C.

One approach would be to build a traffic demand matrix for each direction of traffic and consider the effect of committed bandwidth on sites where the bandwidth commitments are not the same. In fact, the maximum traffic that can be provided between the two sites can be the minimum of the two bandwidths, to thereby provide the traffic demand matrix of Table 1.

TABLE 1

| Direction | CBW1 | CBW2 | MIN (CBW1, CBW2) |
|---|---|---|---|
| A→B | z | x | x |
| A←B | z | x | x |
| B→C | x | y | y |
| C←B | x | y | y |
| A→C | z | y | y |
| A←C | z | y | y |

Thus, there is a symmetrical demand between the sites, as shown in Table 1, of:

AB x Mb/s

BC y Mb/s

AC y Mb/s

Accordingly, symmetric traffic between the site interfaces may be assumed.

The CBW can have a major impact in the ingress direction where it is policed. In the egress direction, there may be a physical limit that is the line rate. However, egress traffic can burst to a level between the CBW rate and the line rate, as traffic aggregates from multiple sources.

The customer may select and pay for the value of CBW for each site. For site A, the head end should have z>x and z>y. Having z>x+y may not be desirable, as the customer may be paying for bandwidth that the customer could never use. Even dimensioning the hub site as the sum of the leaf sites may not be desirable if there are a large number of leaf sites. This may be especially true if the application driving the traffic is essentially polling those leaf sites.

It is also reasonable to consider a customer network of sites, where the committed bandwidth allocations are all the same, i.e., x=y=z. Thus, the demand between sites is also the same value (x=y=z in this case). A description of how to go about mapping this logical demand to a real physical network as shown in FIG. 13B now will be described. In FIG. 13B, some of the logical demands follow the same physical path. For example, consider physical link ga which supports the demand ab and the demand ac, as shown in Table 2.

TABLE 2

| Demand | Direction | Links | Traffic |
|---|---|---|---|
| ab | A↔B | ag, bg | x |
| bc | B↔C | bg, cg | y |
| ac | A↔C | ag, cg | y |

If bandwidth is reserved on the link ga for each logical demand pair (for example ab+ac), an aggregate demand of x+y Mb/s is obtained. If this is a headquarters scenario, where Z is provisioned as z=x+y Mb/s, this amount of traffic may actually be generated. If this is the case of all sites with equal bandwidth reservation, this much traffic may never be generated from site A, so that excessive bandwidth may be reserved on the internal links or trunks. Thus, in practice, the maximum bandwidth that may be applied to that link is MIN(z, SUM(x+y)) not SUM(x,y). See Table 3.

TABLE 3

| Link | Traffic | A↔B Capacity | A↔C Capacity | B↔C Capacity | Max Inflow | Max Outflow | Design Capacity |
|---|---|---|---|---|---|---|---|
| ag | A↔B, A↔C | x | y | NA | x + y | z | MIN(z, x + y) |
| bg | A↔B, B↔C | x | NA | y | x + y | x | MIN(x, x + y) = x |
| cg | C↔B, A↔C | NA | y | y | y + y | y | MIN(y, y + y) = y |

Figure 14:
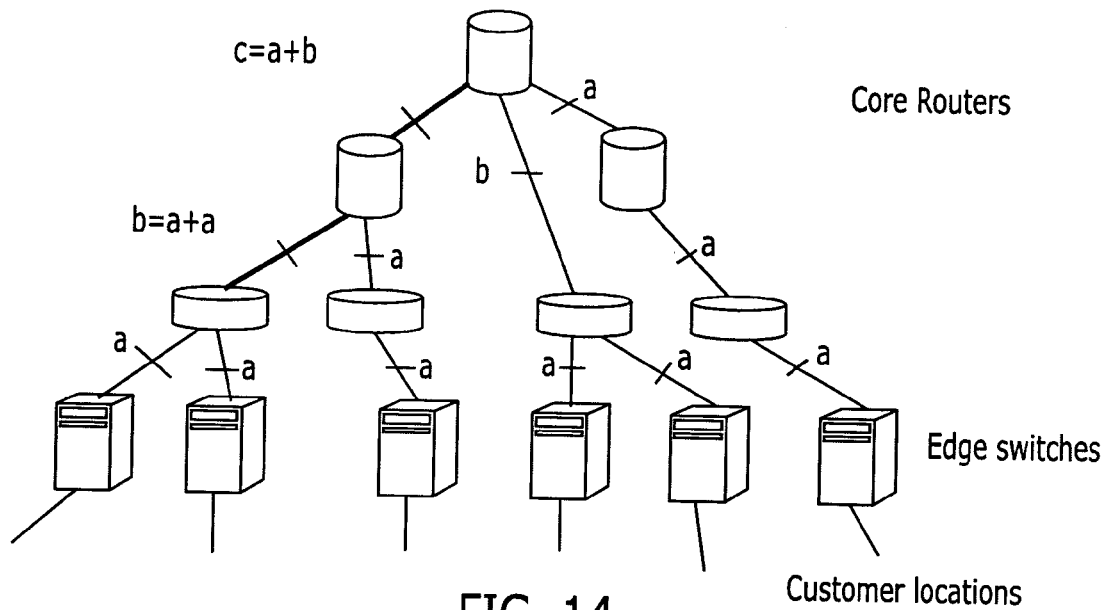
FIG. 14 is a block diagram of tree topology according to various embodiments of the present invention.

FIG. 14 illustrates a tree topology for a packet switched communications network, which may be used with embodiments of the present invention. In a simple tree structure, the bandwidths of all the links are identical. In other embodiments, a "fat" tree structure may be used, where the bandwidth on the links increase towards the core. Other loop-free tree structures may be used.

For stringent Quality-of-Service (QoS) guarantees on bandwidth (such as with CBW), the link bandwidth between the edge routers and the next level in the tree can be the sum of the CBW bandwidths from the virtual LAN participants attached to that edge node. For less stringent QoS guarantees, such as statistical guarantees, a lesser bandwidth towards the core may be used. In this case, there may be reliance upon user traffic statistics such that simultaneous peak usage by all edge nodes is unlikely. This can provide a mechanism for engineering the degree of oversubscription of core network bandwidth.

The tree structure need not be regular in the sense of all nodes having the same degree or all leaves having the same depth from the core. The tree structure may be particularly convenient because it is loop-free, which can avoid a number of potential routing problems. The tree structure also matches the topology of real access networks. The construction of the tree structure virtual topology may initially be manually configured on the switches and routers involved. In other embodiments, this virtual topology may be automated. A variety of algorithms exist to generate such tree structures. For example, the tree may be constructed as a core-based-tree or a Steiner tree. Several protocols have been developed for generating such tree structures, such as a spanning tree algorithm of Ethernet and various protocols for multi-cast trees. These protocols are well known to those having skill in the art and need not be described in detail herein.

Figure 15:
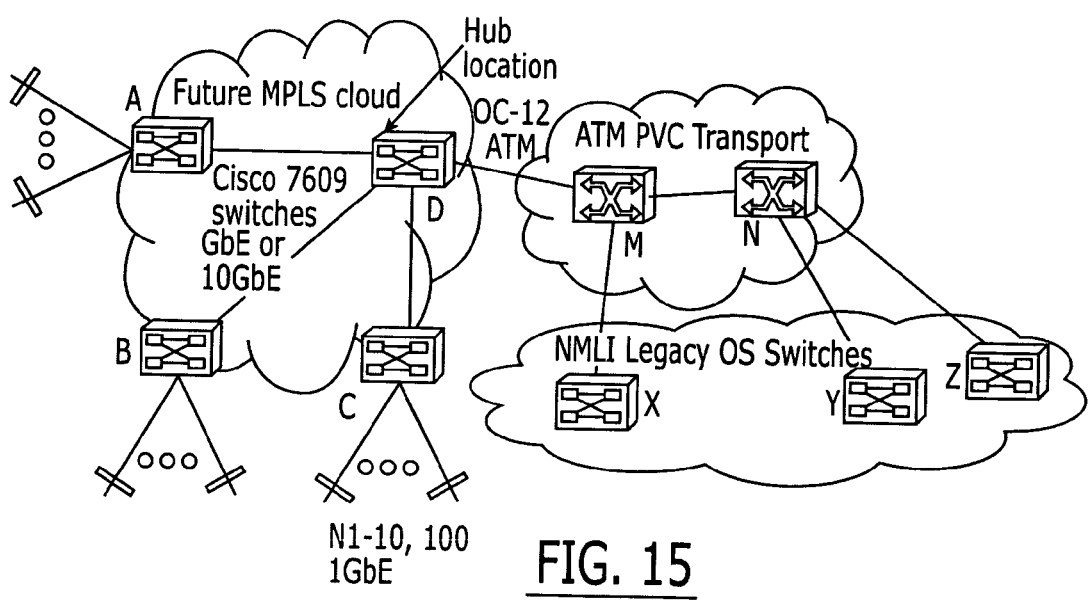
FIG. 15 is a block diagram of packet switched communications networks according to other embodiments of the present invention that are dimensioned according to other embodiments of the present invention.

FIG. 15 provides an example of a network architecture that may be dimensioned according to embodiments of the present invention. CBW may be supported off the new switches directly. Thus, in some embodiments, the aggregate subscriber CBW bandwidth at the edge switch may be supported at the trunk interface. Thus, if there are ten customer sites terminated on one edge switch, with 50 Mb/s of CBW on the 100 Mb/s interface to each of these sites, then the aggregate CBW bandwidth reservation back toward the hub switch may be 500 Mb/s. The architecture shown in FIG. 15 has a single level of hierarchy based around a hub switch. Smaller Local Access and Transport Areas (LATAs) may have only a single switch and not a hub at all. There may be a need to constrain the number of clients on a single switch, to reduce the size of a failure zone. A second level of hierarchy (a hub of hubs) may be used if desired. In other networks, ATM Permanent Virtual Connections (PVCs) may be used to provide committed bandwidth across the ATM transport network to legacy switches. The legacy switches may have limited QoS and policing capabilities. However, it may be possible to approximate the service by providing the QoS and policing functions in the hub switch using additional bandwidth through the ATM network. The trunks between the edge switches and the hub switch will be shared trunks carrying both best effort (fixed) and premium (committed) traffic. These may be distinguished by an IEEE 802.1p codepoint.

Accordingly, some embodiments of the present invention can dimension internal links of a packet switched communications network based on a service definition of committed bandwidths. By using dimensioning techniques according to some embodiments of the present invention, the network capacity may be fixed for a given level of service and additional capacity requirements may create a new service order as they exceed the original design specification. Embodiments of the present invention may be used for an Ethernet service, such as a metropolitan area Ethernet service, and can also be used for dimensioning trunks for virtual private network services and/or Frame relay services.

In embodiments of the present invention, capacity requirements at each access port may be defined by obtaining agreement from a customer as to the committed bandwidth that is purchased. The network capacity may then be defined as the service that is provided using a specific capacity planning or dimensioning rule. Routes through the network may then be identified and the capacity planning rule may be applied to each link. A customer may purchase a connectionless service with a specified access capacity and a network capacity may be determined by the service definition. When that capacity is exceeded, the customer can purchase additional capacity.

As was described above, for committed bandwidth service, a dimensioning rule may calculate the aggregate customer demand (committed bandwidth) on each end of a link, and then dimension the link at the minimum of the demands at either end of the link. For a fixed link bandwidth service, on each link, the customer demand is provisioned at the same fixed bandwidth, because the customer is guaranteed that the link bandwidth is never less than x on any link that the customer's traffic traverses.

As customer traffic grows over time, eventually it may exceed the design capacity of the network. At that point, the customer may notice degraded performance and/or the network provider may document degraded performance. The performance degradation provides an incentive for the customer to request increased capacity. That service order can then provide a trigger for dimensioning additional capacity in the network. The service order also can be billed to the customer, which can reduce or avoid the "all you can eat" problem.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A method of dimensioning a packet switched communications network that includes a plurality of nodes that are interconnected by a plurality of links, to accommodate committed bandwidths for a plurality of ports that are connected to the packet switched communications network, the method comprising:
   providing bandwidth in a given link that includes first and second ends, based on a link dimensioning rule that is a function of committed bandwidths from ports that are connected to the first end of the given link and ports that are connected to the second end of the given link;
   wherein the plurality of ports is a first plurality of ports, the dimensioning also accommodating fixed bandwidths for a plurality of second ports that are connected to the packet switched communications network, the providing bandwidth in the given link comprising:
   identifying a first sum of committed bandwidths from ports that are connected to the first end of the given link and a second sum of committed bandwidths from ports that are connected to the second end of the given link; and
   providing bandwidth at the given link that is at least equal to a minimum of the first sum plus a sum of fixed bandwidths from the plurality of second ports that are connected to the first end of the given link, and the second sum plus a sum of fixed bandwidths from the plurality of second ports that are connected to the second end of the given link.

2. A method according to claim 1 further comprising:
   repeatedly performing providing bandwidth for the plurality of links to thereby dimension the packet switched communications network.

3. A method according to claim 1 wherein the packet switched communications network provides a plurality of virtual private networks between selected ones of the plurality of ports and wherein providing bandwidth further comprises:
   providing bandwidth in a given link that includes first and second ends, for a selected one of the virtual private networks, based on a link dimensioning rule that is a function of ports that are connected to the first end of the given link for the selected one of the plurality of virtual private networks and ports that are connected to the second end of the given link for the selected one of the plurality of virtual private networks; and
   repeatedly performing providing bandwidth in a given link for the plurality of virtual private networks to thereby determine an aggregate bandwidth for the given link.

4. A method according to claim 3 further comprising:
   repeatedly performing providing bandwidth for the plurality of links for the plurality of virtual private networks to thereby dimension the packet switched communications network.

5. A method according to claim 1 wherein the packet switched communications network is an Ethernet network and wherein the links comprise Ethernet bridges.

6. A method according to claim 1 further comprising:
   modeling the packet switched communications network as a loop-free tree comprising the plurality of nodes and the plurality of links; and
   wherein providing bandwidth in a given link comprises providing bandwidth in a given link of the loop-free tree that includes first and second ends, based on a link dimensioning rule that is a function of committed bandwidths from ports that are connected to the first end of the given link and ports that are connected to the second end of the given link.

7. A method of dimensioning a packet switched communications network that includes a plurality of nodes that are interconnected by a plurality of links, to accommodate committed bandwidths for a plurality of ports that are connected to the packet switched communications network, the method comprising:
   providing bandwidth in a given link that includes first and second ends, based on a link dimensioning rule that is a function of committed bandwidths from ports that are connected to the first end of the given link and ports that are connected to the second end of the given link;
   wherein one of the ports that is connected to the second end of the given link is a hub having a hub committed bandwidth, and wherein providing bandwidth in the given link comprises:
   identifying a first sum of committed bandwidths from ports that are connected to the first end of the given link and a second sum of committed bandwidths from ports that are connected to the second end of the given link; and
   providing bandwidth in the given link that is at least equal to a minimum of the first sum, and the hub committed bandwidth minus the second sum.

8. A method according to claim 7 wherein providing bandwidth in the given link that is at least equal to a minimum of the first sum, and the hub committed bandwidth minus the second sum comprises:
   providing bandwidth in the given link that is at least equal to a minimum of the first sum and the hub-committed bandwidth.

9. A method according to claim 8 wherein providing bandwidth in the given link that is at least equal to a minimum of the first sum and the hub committed bandwidth comprises:

providing bandwidth in the given link that is equal to a minimum of the first sum and the hub committed bandwidth.

10. A method of providing communications service by a packet switched communications network provider to a customer over a plurality of customer ports that are connected to a packet switched communications network that includes a plurality of nodes that are interconnected by a plurality of links, comprising the following that are performed by the packet switched communications network provider:

agreeing to provide communications service for the customer through the packet switched communications network at a first committed bandwidth;

dimensioning at least some of the links to accommodate the first committed bandwidth;

agreeing to provide communications service for the customer through the packet switched communications network at a second committed bandwidth that is greater than the first committed bandwidth, upon occurrence of degraded performance for the customer over the packet switched communications network; and dimensioning at least some of the links to accommodate the second committed bandwidth;

wherein dimensioning at least some of the links to accommodate first committed bandwidth and dimensioning at least some of the links to accommodate the second committed bandwidth comprise:

providing bandwidth in a given link that includes first and second ends, based on a link dimensioning rule that is a function of committed bandwidths from ports that are connected to the first end of the given link and ports that are connected to the second end of the given link;

wherein the plurality of ports is a first plurality of ports, the dimensioning also accommodating fixed bandwidths for a plurality of second ports that are connected to the packet switched communications network, the providing bandwidth in the given link comprising:

identifying a first sum of committed bandwidths from ports that are connected to the first end of the given link and a second sum of committed bandwidths from ports that are connected to the second end of the given link; and providing bandwidth at the given link that is at least equal to a minimum of the first sum plus a sum of fixed bandwidths from the plurality of second ports that are connected to the first end of the given link, and the second sum plus a sum of fixed bandwidths from the plurality of second ports that are connected to the second end of the given link.

11. A method according to claim 10 wherein agreeing to provide communications service for the customer through the packet switched communications network at a second committed bandwidth that is greater than the first committed bandwidth comprises:

agreeing to provide communications service for the customer through the packet switched communications network at a second committed bandwidth that is greater than the first committed bandwidth, upon reporting of the degraded performance by the customer.

12. A method according to claim 10 wherein the agreeing to provide communications service for the customer through the packet switched communications network at a second committed bandwidth that is greater than the first committed bandwidth comprises:

agreeing to provide communications service for the customer through the packet switched communications network at a second committed bandwidth that is greater than the first committed bandwidth, upon detecting of the degraded performance by the packet switched network provider.

13. A method according to claim 10:

wherein agreeing to provide communications service for the customer through the packet switched communications network at a first committed bandwidth comprises agreeing to provide communications service for the customer through the packet switched communications network at a first committed bandwidth and for a first financial charge; and wherein agreeing to provide communications service for the customer through the packet switched communications network at a second committed bandwidth that is greater than the first committed bandwidth, upon occurrence of degraded performance for the customer over the packet switched communications network comprises agreeing to provide communications service for the customer through the packet switched communications network at a second committed bandwidth that is greater than the first committed bandwidth and at a second financial charge that is greater than the first financial charge, upon occurrence of degraded performance for the customer over the packet switched communications network.

14. A method according to claim 10 wherein providing bandwidth in the given link comprises:

identifying a first sum of committed bandwidths from the ports that are connected to the first end of the given link and a second sum of committed bandwidths from the ports that are connected to the second end of the given link; and providing bandwidth in the given link that is at least equal to a minimum of the first sum and the second sum.

15. A method according to claim 14 wherein providing bandwidth in the given link that is at least equal to a minimum of the first sum and the second sum comprises:

providing bandwidth in the given link that is equal to the minimum of the first sum and the second sum.

16. A method of providing communications service by a packet switched communications network provider to a customer over a plurality of customer ports that are connected to a packet switched communications network that includes a plurality of nodes that are interconnected by a plurality of links, comprising the following that are performed by the packet switched communications network provider:

agreeing to provide communications service for the customer through the packet switched communications network at a first committed bandwidth;

dimensioning at least some of the links to accommodate the first committed bandwidth;

agreeing to provide communications service for the customer through the packet switched communications network at a second committed bandwidth that is greater than the first committed bandwidth, upon occurrence of degraded performance for the customer over the packet switched communications network; and dimensioning at least some of the links to accommodate the second committed bandwidth;

wherein dimensioning at least some of the links to accommodate first committed bandwidth and dimensioning at least some of the links to accommodate the second committed bandwidth comprise:
providing bandwidth in a given link that includes first and second ends, based on a link dimensioning rule that is a function of committed bandwidths from ports that are connected to the first end of the given link and ports that are connected to the second end of the given link;
wherein one of the ports that is connected to the second end of the given link is a hub having a hub committed bandwidth, and wherein providing bandwidth in the given link comprises:
identifying a first sum of committed bandwidths from ports that are connected to the first end of the given link and a second sum of committed bandwidths from ports that are connected to the second end of the given link; and
providing bandwidth in the given link that is at least equal to a minimum of the first sum, and the hub committed bandwidth minus the second sum.

17. A method according to claim 16 wherein providing bandwidth in the given link that is at least equal to a minimum of the first sum, and the hub committed bandwidth minus the second sum comprises:
providing bandwidth in the given link that is at least equal to a minimum of the first sum and the hub-committed bandwidth.

18. A method according to claim 17 wherein providing bandwidth in the given link that is at least equal to a minimum of the first sum and the hub committed bandwidth comprises:
providing bandwidth in the given link that is equal to a minimum of the first sum and the hub committed bandwidth.

19. A method according to claim 16 further comprising:
modeling the packet switched communications network as a loop-free tree comprising the plurality of nodes and the plurality of links; and
wherein providing bandwidth in a given link comprises providing bandwidth in a given link of the loop-free tree that includes first and second ends, based on a link dimensioning rule that is a function of committed bandwidths from ports that are connected to the first end of the given link and ports that are connected to the second end of the given link.

20. A method according to claim 16 wherein the packet switched communications network is an Ethernet network and wherein the links comprise Ethernet bridges.

21. A packet switched communications network comprising:
a plurality of nodes that are interconnected by a plurality of links;
a plurality of ports that are connected to the packet switched communications network, at least some of which are subject to a committed bandwidth; and
at least one of the links including first and second ends and having bandwidth that is selected based on a link dimensioning rule that is a function of committed bandwidths from ports that are connected to the first end and ports that are connected to the second end;
wherein the plurality of ports is a first plurality of ports, the link dimensioning rule also accommodating fixed bandwidths for a plurality of second ports that are connected to the packet switched communications network, the link dimensioning rule comprising:
identifying a first sum of committed bandwidths from ports that are connected to the first end of the given link and a second sum of committed bandwidths from ports that are connected to the second end of the given link; and
providing bandwidth at the given link that is at least equal to a minimum of the first sum plus a sum of fixed bandwidths from the plurality of second ports that are connected to the first end of the given link, and the second sum plus a sum of fixed bandwidths from the plurality of second ports that are connected to the second end of the given link.

22. A network according to claim 21 wherein the link dimensioning rule comprises:
identifying a first sum of committed bandwidths from the ports that are connected to the first end and a second sum of committed bandwidths from the ports that are connected to the second end; and
providing bandwidth in the link that is at least equal to a minimum of the first sum and the second sum.

23. A network according to claim 22 wherein the link dimensioning rule is applied to the plurality of links.

24. A network according to claim 21 wherein the packet switched communications network provides a plurality of virtual private networks between selected ones of the plurality of ports and wherein the link dimensioning rule is a function of ports that are connected to the first end for the selected one of the plurality of virtual private networks and ports that are connected to the second end for the selected one of the plurality of virtual private networks, and wherein the dimensioning rule is applied for the plurality of virtual private networks to thereby determine an aggregate bandwidth for the link.

25. A network according to claim 24 wherein the link dimensioning rule is applied to the plurality of links.

26. A network according to claim 21 wherein the packet switched communications network is an Ethernet network and wherein the links comprise Ethernet bridges.

27. A packet switched communications network comprising:
a plurality of nodes that are interconnected by a plurality of links;
a plurality of ports that are connected to the packet switched communications network, at least some of which are subject to a committed bandwidth; and
at least one of the links including first and second ends and having bandwidth that is selected based on a link dimensioning rule that is a function of committed bandwidths from ports that are connected to the first end and ports that are connected to the second end;
wherein one of the ports that is connected to the second end of the given link is a hub having a hub committed bandwidth, and wherein the link dimensioning rule comprises:
identifying a first sum of committed bandwidths from ports that are connected to the first end of the given link and a second sum of committed bandwidths from ports that are connected to the second end of the given link; and
providing bandwidth in the given link that is at least equal to a minimum of the first sum, and the hub committed bandwidth minus the second sum.

28. A network according to claim 27:
wherein the packet switched communications network is modeled as a loop-free tree comprising the plurality of nodes and the plurality of links; and wherein the link dimensioning rule is a function of committed bandwidths from ports that are connected to the first end of the given link and ports that are connected to the second end of the given link.

29. A link of a packet switched communications network that includes a plurality of nodes that are interconnected by a plurality of links and a plurality of ports that are connected to the packet switched communications network, at least some of which are subject to a committed bandwidth, the link comprising:
  first and second ends; and
  a link bandwidth that is selected based on a link dimensioning rule that is a function of committed bandwidths from ports that are connected to the first end of the link and ports that are connected to the second end of the link;
  wherein the plurality of ports is a first plurality of ports, the link dimensioning rule also accommodating fixed bandwidths for a plurality of second ports that are connected to the packet switched communications network, the link dimensioning rule comprising:
  identifying a first sum of committed bandwidths from ports that are connected to the first end of the given link and a second sum of committed bandwidths from ports that are connected to the second end of the given link; and
  providing bandwidth at the given link that is at least equal to a minimum of the first sum plus a sum of fixed bandwidths from the plurality of second ports that are connected to the first end of the given link, and the second sum plus a sum of fixed bandwidths from the plurality of second ports that are connected to the second end of the given link.

30. A link of a packet switched communications network that includes a plurality of nodes that are interconnected by a plurality of links and a plurality of ports that are connected to the packet switched communications network, at least some of which are subject to a committed bandwidth, the link comprising:
  first and second ends; and
  a link bandwidth that is selected based on a link dimensioning rule that is a function of committed bandwidths from ports that are connected to the first end of the link and ports that are connected to the second end of the link;
  wherein one of the ports that is connected to the second end of the given link is a hub having a hub committed bandwidth, and wherein the link dimensioning rule comprises:
  identifying a first sum of committed bandwidths from ports that are connected to the first end of the given link and a second sum of committed bandwidths from ports that are connected to the second end of the given link; and
  providing bandwidth in the given link that is at least equal to a minimum of the first sum, and the hub committed bandwidth minus the second sum.

31. A link according to claim 30:
  wherein the packet switched communications network is modeled as a loop-free tree comprising the plurality of nodes and the plurality of links; and
  wherein the link dimensioning rule is a function of committed bandwidths from ports that are connected to the first end of the given link and ports that are connected to the second end of the given link.

32. A link according to claim 30 wherein the link dimensioning rule comprises:
  identifying a first sum of committed bandwidths from the ports that are connected to the first end of the link and a second sum of committed bandwidths from the ports that are connected to the second end of the link; and
  providing bandwidth in the link that is at least equal to a minimum of the first sum and the second sum.

33. A link according to claim 30 wherein the packet switched communications network provides a plurality of virtual private networks between selected ones of the plurality of ports and wherein the link dimensioning rule is a function of ports that are connected to the first end of the link for the selected one of the plurality of virtual private networks and ports that are connected to the second end of the link for the selected one of the plurality of virtual private networks, and wherein the dimensioning rule is applied for the plurality of virtual private networks to thereby determine an aggregate bandwidth for the link.

34. A link according to claim 30 wherein the packet switched communications network is an Ethernet network and wherein the link comprises and Ethernet bridge.

* * * * *